United States Patent [19]

Richards

[11] Patent Number: 4,793,580

[45] Date of Patent: Dec. 27, 1988

[54] WIREWAY SUSPENSION SYSTEM WITH BRACED SUPPORT LEG CONSTRUCTION

[76] Inventor: Peter S. Richards, 100 Mt. Si Pl., NW., Issaquah, Wash. 98027

[21] Appl. No.: 173,990

[22] Filed: Mar. 28, 1988

Related U.S. Application Data

[63] Continuation-in-part of Ser. No. 47,051, May 6, 1987, Pat. No. 4,735,390.

[51] Int. Cl.[4] .............................................. F16M 11/16

[52] U.S. Cl. .................................... 248/188; 108/156; 248/65

[58] Field of Search ...................... 248/188, 677, 188.8, 248/230, 231, 219.3, 219.4, 218.4, 68.1, 65; 211/107; 403/231, 245, 227, 104; 108/156; 297/440, 445; 5/316

[56] References Cited

U.S. PATENT DOCUMENTS

| | | | |
|---|---|---|---|
| 892,839 | 7/1908 | Innes | 108/156 |
| 1,675,827 | 7/1928 | Shrader | 108/156 |
| 1,762,776 | 6/1930 | Gardner | 108/156 X |
| 1,806,169 | 5/1931 | Kohler | 108/156 X |
| 2,730,419 | 1/1956 | Watrous | 248/188 |
| 2,901,301 | 8/1959 | Johnson | 108/156 |
| 3,063,765 | 11/1962 | Huff | 108/156 UX |
| 3,322,384 | 5/1967 | Rodwell | 248/188 |
| 3,506,227 | 4/1970 | Jenkins | 248/59 |
| 3,530,804 | 9/1970 | Broome | 108/156 |
| 3,784,254 | 1/1974 | Longato | 297/445 |
| 3,787,016 | 1/1974 | Laval | 248/68.1 X |
| 3,923,277 | 12/1975 | Perrault | 248/68.1 X |
| 3,928,929 | 12/1975 | Forte | 248/230 |
| 3,944,175 | 3/1976 | Kearney | 248/68.1 X |
| 3,966,340 | 6/1976 | Morris | 403/353 |

*Primary Examiner*—J. Franklin Foss

*Attorney, Agent, or Firm*—Delbert J. Barnard

[57] ABSTRACT

A wireway suspension system includes a support leg (16) attachable at an upper end to an overhead member (10) and having an elongated cross-beam member (48) perpendicularly attachable to the support leg (16). The support leg (16) has squared portions (50) at which the cross-beam (48) is mountable. The cross-beam (48) has a first portion (52) which is adjacent one side of the squared portion (50) of the support leg (16). Second and third portions (58, 59) extend outwardly and perpendicularly from the first portion (52) in directions opposite of each other. The third portion (59) which extends toward the support leg (16) is notched to receive and closely engage two opposed sides of the squared portion (50) of the support leg (16). A U-bolt (66) having two threaded end portions (68) and a substantially squared bight portion (70) closely engage three adjacent sides of the squared portion (50). The threaded end portions (68) extend through openings (72) in the first portion (52) of the cross-beam (48). Flanged nuts (74) are placed on the U-bolt (66) outwardly of the cross-beam (48) to complete the attachment.

6 Claims, 4 Drawing Sheets

WIREWAY SUSPENSION SYSTEM WITH BRACED SUPPORT LEG CONSTRUCTION

RELATED APPLICATION

This application is a continuation-in-part of my co-pending application U.S. Ser. No. 47,051, filed May 6, 1987, entitled "SUPPORT LEG JOINT CONSTRUCTION WITH BRACING" now U.S. Pat. No. 4,735,390.

TECHNICAL FIELD

This invention in part relates to a threaded joint construction between two members, and in particular to a screw joint construction between a threaded stud depending from an overhead structure and an end portion of an elongated support leg, and to a simple structure and arrangement for bracing the treaded joint to increase its capacity to withstand sideways loads applied on the support leg and protect it against shock loads and vibration.

This invention also relates to a wireway suspension system of the type having cross members mountable to a downwardly extending elongated support leg.

BACKGROUND ART

The present invention was made as a part of an effort to provide an improved mounting structure for a suspended object (e.g. a lighting fixture). It is believed that the joint construction of the invention has general utility. However, it is known to have particular application for connecting the upper end of a support leg for a light fixture to an overhead structure in a ship. The present invention also provides a wireway suspension system having inproved static and synamic load bearing capability and being readily adaptable for versatile applications.

Ship construction is done in stages. Quite often, a component is installed and then it is discovered that the component must be removed in order to either install another component, or perform some other stage of the construction of the ship. Light fixtures must be securely afixed to the ceiling structure and this has in the past been done by welding the upper ends of support leg members to a metal ceiling structure and then welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the support leg member to the ceiling structure, so that if it becomes necessary to remove the support leg structure, it can be done without distructive effects to this component, so that such component can be reused. The mounting structure of the present invention makes it easy to raise or lower a lighting fixture or similar object. The mounting structure only may be disassembled and then reassembled with a longer or shorter leg member.

The wireway suspension system of the present invention provides a horizontal cross-beam with substantial static load-bearing capability and an attachment of the crossbeam to the support leg which resists rotation relative to the support leg by providing an efficient transfer of vibrational and shock loads placed on the cross-beam to the support leg.

DISCLOSURE OF THE INVENTION

In basic form, the joint construction of the present invention comprises a rod member which depends from an overhead member and includes a threaded portion. An elongated support leg is provided. The support leg has a tubular upper portion in which an insert is provided. The insert has a threaded longitudinal opening for threaded engagement with the threads on the depending member, to form a screw joint. A brace member is provided at the upper end of the support leg. The brace member includes a lower small end and an upper large end. An opening is formed in the small end through which an upper portion of the support leg extends. The base member is connected to the support leg at a location spaced axially downwardly from the upper end of the support leg. The brace member has a circular edge at its upper end which is substantially larger in diameter than the support leg. The edge is positioned to make contact with the overhead member when the support leg is installed on the depending member and the screw joint is tightened.

In accordance with an aspect of the invention, the insert includes an upper end spaced axially inwardly of the support leg from the upper end of the support leg, and a lower opposite end. The support leg decreases in diameter through regions both above and below the insert, for in that manner retaining the insert in place within the support leg.

In accordance with another aspect of the invention, the upper end of the support leg is spaced axially inwardly from the circular edge at the upper end of the brace member, so that the support leg can be rotated to tighten the screw joint between the insert and the depending member and such tightening will force the circular upper edge of the brace member into tight contact with the overhead member without the upper end of the support leg member reaching the level of the overhead member.

In preferred form, the upper end of the depending member is welded to the overhead member and a fillet weld surrounds the upper end of the depending member. The support leg includes a circular edge at its upper end positioned to contact the fillet weld as the support leg is being rotated to tighten the screw joint between the insert and the depending member. Galling occurs at the location of contact between the fillet weld and the upper end of the support leg, such that metal is deformed and a tight fit is made between the upper end of the support leg and the fillet weld. This tight fit serves to laterally brace the upper end of the support leg, so as to resist the tendancy of the support leg to rotate in position about its connection with the lower end of the brace member in response to sideways loads applied to the support leg below the brace member.

The use of the brace member in compression as a "preload" on the joint is an important aspect of the invention. The preload compression absorbs shock load spikes and various forms of vibration. Stated another way, the use of a preloaded brace member protects the depending member from traumatic failure due to shock load spikes. The brace member is also resilient enough to absorb structural vibration. Such vibration is absorbed and thus not transmitted to the depending member.

An important feature of the support leg joint construction is that the amount of preloading of the brace member can be controlled by the selection of the diameter of its upper end. As will be apparent, rotation of the support leg member will cause the upper circular edge of the brace member to bear against the overhead member. The support leg can be rotated until the pressure exerted by the upper end of the brace member against the overhead support prevents further rotation by muscle energy. The resistance to further rotation signals a stopping point to the application of a rotation.

In preferred form, the support leg is formed to include wrench flats below the inserts, to receive jaws of a wrench for rotating the support leg.

In basic form, the wireway suspension system of the present invention comprises a downwardly depending elongated support leg attachable at an upper end to an overhead member, and an elongated cross-beam member perpendicularly attachable to the support leg. The support leg has one or more substantially squared portions along its length. The cross-beam comprises a vertical first portion which extends substantially perpendicularly to the support leg and in a plane adjacent and parallel to one side of the squared portion of the support leg. This first portion has first and second edges along its length from which extend substantially perpendicular second and third portions. The second portion extends outwardly from the first edge of the first portion away from the support leg and the third portion extends outwardly from the second edge of the first portion toward the support leg. The third portion is notched to receive and closely engage two opposed sides of the squared portion of the support leg.

The beam is attachable to the support leg by a U-bolt having two threaded end portions and a substantially squared bight portion. In this way, the U-bolt comprises two substantially parallel arms, each of which extends substantially perpendicularly from a straightened central portion. The end portions of the U-bolt extend through openings formed in the first portion of the cross-beam and the squared bight portion closely engages three adjacent sides of the squared portion of the support leg. Flanged nuts are threadedly engaged on the threaded ends of the U-bolt and bare against the first portion of the cross-beam such that the cross-beam is bound to the support leg against one side of the squared portion. The squared portion is surrounded on three adjacent sides by the squared U-bolt and on its fourth side by the first portion of the cross-beam.

The use of flanged nuts on the U-bolt is an important aspect of the invention. A substantial amount of the force placed on the cross-beam by the nuts is directed over the portion of the cross-beam which is adjacent to the support leg rather than outwardly therefrom. This construction causes the vertical portion of the cross-beam which is between the arms of the U-bolt to act as a strongback. The closed end of the U-bolt acts as a second strongback. Without such construction, the tightening of the nuts would cause the outwardly-projecting portions of the beam to want to bend toward the closed end of the bolt making a dihedral of the cross-beam.

In accordance with yet another aspect of the invention, a bendable tab is welded to the brace member outwardly of the upper circular edge. After installation of the support leg, this tab may be bent upwardly against the overhead member and tack-welded thereto to deter unauthorized removal of the downcomer member. Tack welding of the brace member at its outer edge to the overhead member, after it has been put into compression, would cause a crack or fissure to be formed in the brace member. Such a fissure relieves the stress put upon the brace member and causes the joint to become plastic or "dead" rather than elastic or "live." The tab, welded to the support brace prior to compression of the brace, provides a means of securing the previously-described joint in a relatively permanent way.

Other more detailed features of the invention are described below in connection with the description of the illustrated embodiment.

BRIEF DESCRIPTION OF THE DRAWING

Like reference numerals are used to designated like parts throughout the several views of the drawing, and.

BEST MODE FOR CARRYING OUT THE INVENTION

Figures 1, 2:
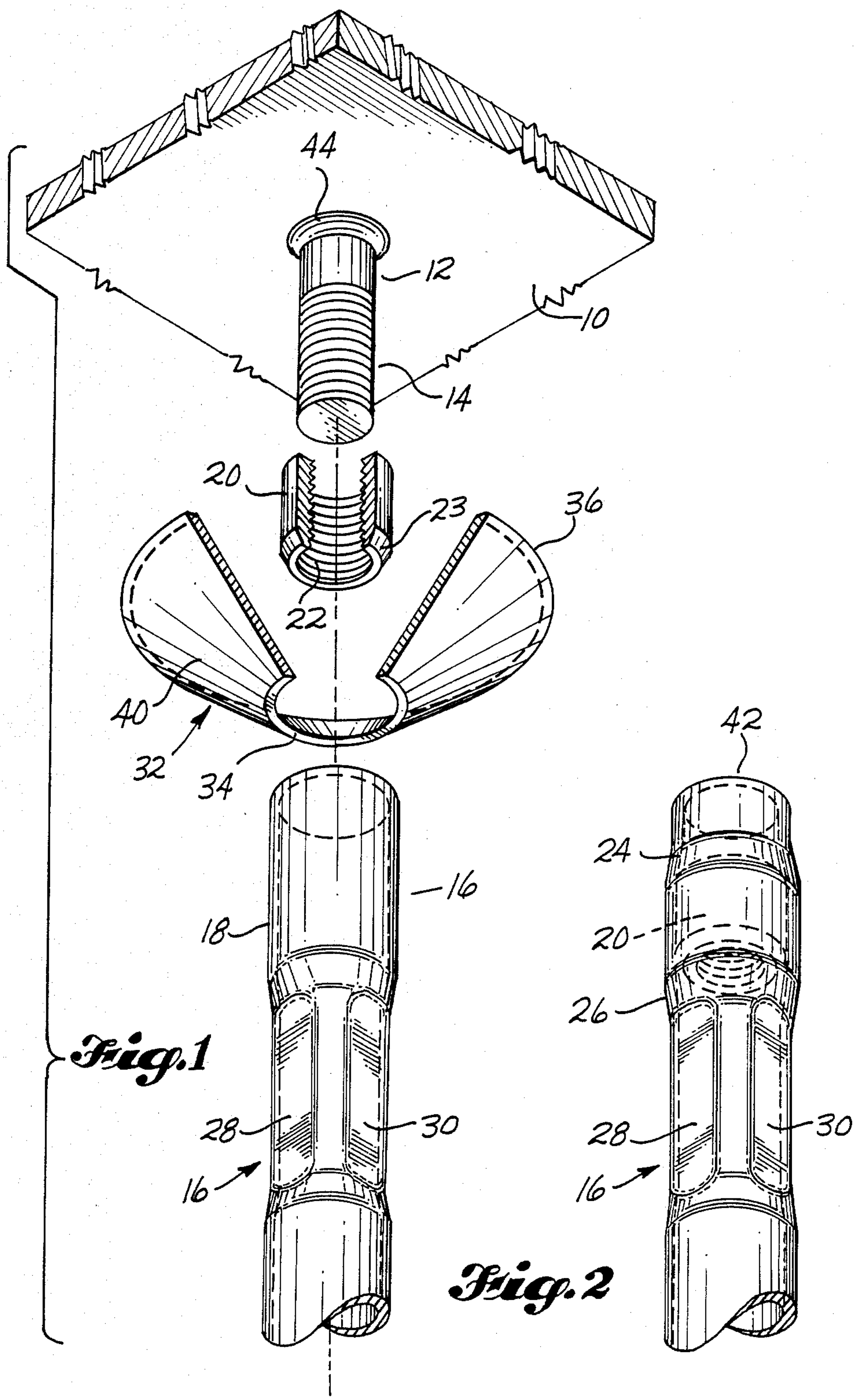
FIG. 1 is an exploded isometric view of the joint construction of the present invention.
FIG. 2 is an assembled isometric view of the support leg with the brace member omitted.

Referring to FIG. 1, member 10 is an overhead structure, e.g. a metal ceiling panel. A rod member or stud 12 is secured at its upper end to the member 10, such as by stud welding, and depends vertically from the member 10. Rod member 12 includes a threaded portion 14.

An elongated support leg 16 is screw connected to the member 14. Support leg 16 includes an upper end portion 18 which is tubular and in which an insert 20 is received. Insert 20 is secured in position to the support leg 16 and includes a threaded longitudinal opening 22 which makes threaded engagement with the threads 14 on member 12, to form a screw joint. The inner end of insert 20 is beveled to help guide insert 20 into tubular portion 18.

Figure 3:
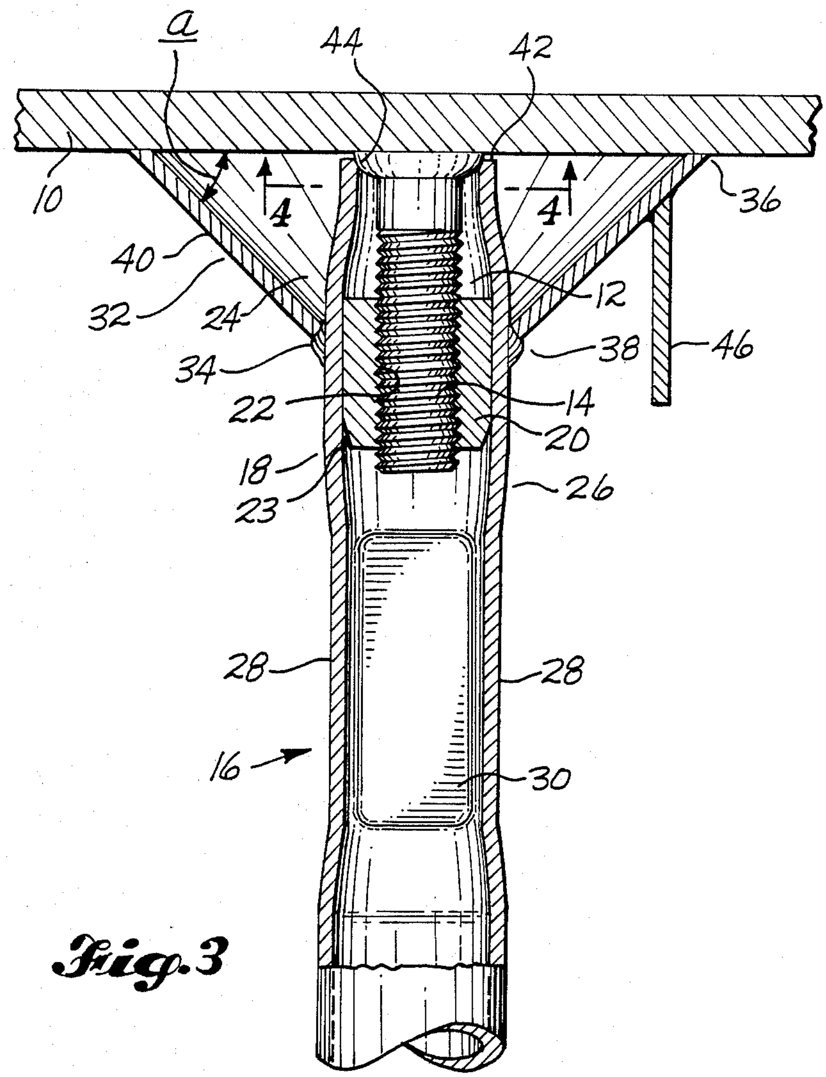
FIG. 3 is a vertical sectional view of the joint construction.

The tubular portion 18 is swaged onto the insert 20. As illustrated by FIG. 3, its portion 24 above the insert 20 and its portion 26 below the insert 20 are reduced in diameter to in that manner prevent member 20 from moving upwardly or downwardly within the tubular portion 18. Preferably, the support leg 16 is formed to include at least one pair of opposed wrench flats 28, below the insert 20. The illustrated embodiment also comprises a second pair of wrench flats 30.

In accordance with the invention, a brace member 32 is provided at the upper end of the support leg 16. Brace member 32 has a small diameter lower end 34 and a large diameter upper end 36. A sidewall 40 extends between the ends 34, 36. Sidewall 40 increases in diameter as it extends upwardly from the lower end 34 to the upper end 36. Brace member 32 may be a conical member, as illustrated.

As illustrated, the small end 34 of brace member 32 includes a central opening through which the upper portion of leg member 16 extends. The brace member 32 is connected to the leg member 16, preferably by the weld bead 38 extending about the upper end portion 18 of member 16, radially outwardly from a portion of the insert 20. The weld bead 38 extends between the small end 34 of brace member 32 and the outer surface of wall portion 18.

Preferably, the width of the brace member 32 at the upper end 36 is between 2.5–3.5 times the diamter of the support leg 16 at its upper end 40 and between 2.5–3.5 times the length of the brace member 32. The particular brace member 32 that is illustrated includes a sidewall 40 which makes an angle a of about 45° with respect to the member 10. This is a preferred angle for a conical brace member. However, the angle may vary somewhat from one installation to another.

In accordance with an aspect of the invention, the brace member 32 extends axially above the end surface 40 of the support leg 16 so that such end surface 40 is axially spaced from member 10 at the time of contact of the upper edge 36 of brace member 32 with the member 10.

Figure 4:
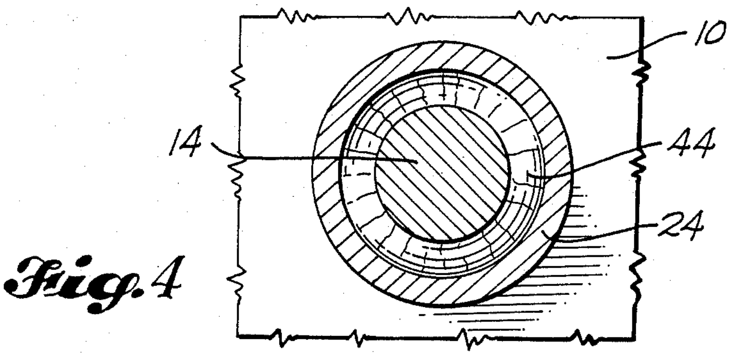
FIG. 4 is a sectional view taken substantially along line 4—4 of FIG. 3.

As shown by FIGS. 1, 3 and 4, the upper end of member 12 may be connected to member 10 by a fillet weld 44. The internal diameter at the upper end 42 of member 16 is larger than the diameter of member 12. However, it is smaller than the maximum diameter of the weld so that the upper end 42 of member 16 contacts the weld 44 before it contacts the member 10.

Support leg 16 is lifted upwardly to place its open upper end into alignment with member 12. Then, member 16 is moved over member 12 so as to bring the threads 14 to the upper end of opening 22. The member 16 is then rotated for the purpose of screwing member 20 onto member 12. Initially rotation is by hand. The member 16 is rotated until the upper edge 36 of brace member 32 contacts or is in close contact with the member 10. At about the same time the upper end 42 of tubular portion 18 makes contact with the weld fillet 44. Rotation of member 16 is continued. A wrench may be used on the wrench flats 28, 30, if necessary. As member 16 is rotated, galling occurs where tubular end 42 makes contact with the weld fillet 44. The weld is harder than the tubing material and so the tubing material is galled. A gap between the end 42 and member 10 makes it possible to draw the edge 36 into tight contact with member 10. The galling which occurs at the end 42 and fillet weld 44 shapes these parts to fit tightly together. This interfit serves to brace the upper end 42 of member 16 against sideways movement in response to a sideways load on member 16 below weld joint 38. As will be appreciated, when the joint is tightened and the upper end 36 of brace member 32 is tight against overhead member 10, a lateral force applied on member 16 at any appreciable distance below weld joint 38 will want to rotate the member 18 in position about weld joint 38, putting stress on such weld joint 38. The tight interfit between the upper end 42 and the weld fillet 44 resists such rotation and thus relieves stress that would otherwise be on the weld joint 38.

As the screw joint 14, 22 is tightened, the brace member 32 is put into compression. It in effect functions like a large Bellevue spring. This putting of the member 32 in compression acts to preload the joint. In some installations, a screw joint can be "preloaded" by tightening the threaded connection until the threaded bolt member is elongated. This type of putting a bolt member in tension acts to preload the joint. This method cannot be relied on where the joint involves a stud that is welded to a base member. If the stud is harder material than the base member, the tightening of the threaded connection would act to deform the base member instead of putting the stud in tension. The supplier of a support leg has no control over the make-up of the stud member and the base member. However, he does have control over the construction of the support leg. The present invention allows the supplier of the support leg to provide a way of preloading the threaded joint which is always reliable.

The use of the member 32 in compression as a "preload" on the joint is very important. The preload compression member 32 absorbs shock load spikes and various forms of vibration. Stated another way, the use of the preload cone 32 protects the stud 14 from traumatic failure due to shock load spikes. Member 32 is also resilient enough to absorb structural vibration. Such vibration is absorbed and thus not transmitted to the stud 14. The stud 14, the weld 44 and the support leg 16 carry the shear loads. These members have excellent shear load carrying capacity. The preload cone 32 absorbs the rip and tear loads.

An important feature of the support leg joint construction of the invention is that the amount of preloading of the cone member 32 can be controlled by the selection of the diameter of the end 36. As will be apparent, rotation of support leg member 16 will cause the circular edge at end 36 to bear against member 10. Member 16 can be rotated until the pressure of end 36 against member 10 prevents further rotation by muscle energy applied by a wrench to the wrench flats 28, 30. The resistance to further rotation signals a stopping point to the application of a rotation causing force on member 16. This occurs before the tube end 42 bottoms against the member 10.

According to another aspect of the invention, a tab 46 is attached, by welding or otherwise, to the cone member 32 downwardly of the edge 36. At the time of installation, the tab 46 is positioned such that is does not protrude radially beyond the edge 36 of the cone 32. After installation of the support leg joint, the tab 46 may be bent outwardly and upwardly to be adjacent or in close proximity to the overhead member 10, and then tack-welded to the overhead member 10. Such an attachment makes the support leg joint relatively permanent and deters unauthorized removal of the support leg member 16. The tab 46 provides a means of more permanently securing the support leg member 16 to the overhead member 10 without directly tack-welding the cone member 32 to the overhead member 10.

In order to retain the integrity of the support leg joint and its features as described above, it is important that the cone member 32 not be direcly tack-welded to the overhead member 10. Tack-welds along the edge 36 after the cone member 32 has been put into compression causes cracks or fissures to form in the cone member 32, thus destroying the integrity of the joint and relieving the stress placed on the cone member 32. If the previously-described compression is relieved from the cone member 32, the joint becomes plastic and "dead" rather than elastic and "live." It is necessary for the joint to remain elastic to provide the previously- described vibrational and shock load bearing capabilities. By attaching a bendable tab 46 to the cone member 32 prior to installation, a weldable portion is provided which will not compromise the integrity of the support leg joint. Furthermore, the welded tab also provides a deterent against unauthorized removal of the support leg member 16 because a weld must be cut in addition to unscrewing the joint with a wrench. The tab member 46, however, may be cut to remove the support leg member 16 without eliminating the re-usability or replaceability of the support leg joint.

Figure 5:
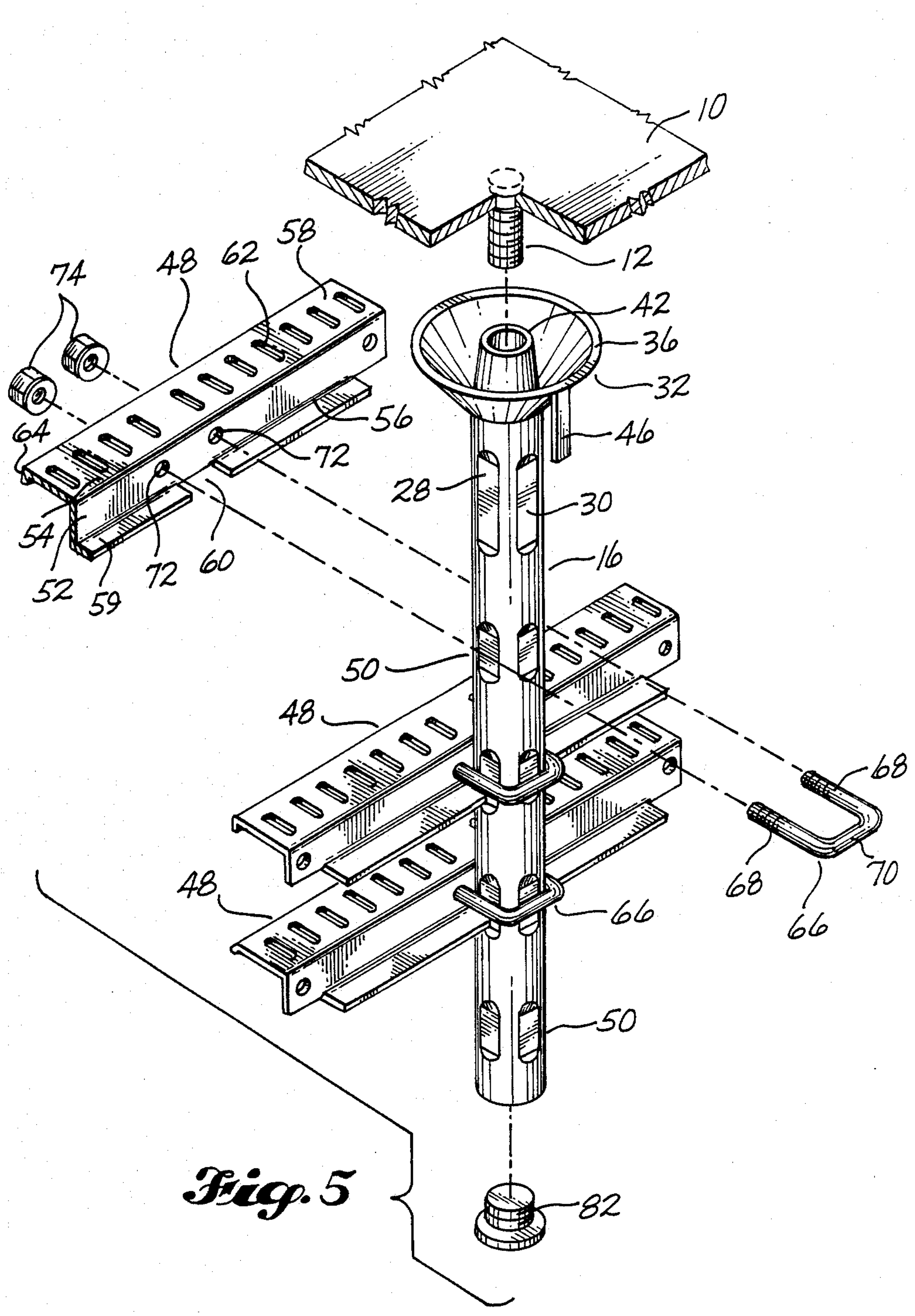
FIG. 5 is an exploded isometric view of the support leg and cross-beams.

Shown in FIG. 5 is an exploded view of a wireway suspension system comprising a downwardly depending elongated support leg 16 which is attachable at an upper end to an overhead member 10 and having cross-beam members 48 perpendicularly attachable thereto. The support leg 16 may be attached to the overhead member 10 using the above-described joint construction. In such form, the support leg 16 would comprise at least one pair of wrench flats 28, 30. The support leg 16 of the present wireway suspension system would further comprise at least one squared portion 50 along its length. The cross-beams 48 are attached to the support leg 16 in the region of the squared portions 50.

In preferred form, the cross-beams 48 comprise a first portion 52 which is positionable in a vertical plane adjacent and parallel to one side of the squared portion 50 of the support leg 16. The first portion 52 of the cross-beam 48 has first and second edges 54, 56 which extend along the length of the cross-beam. A second portion 58 of the cross-beam extends outwardly from the first edge 54 in a direction away from the support leg 16 substantially perpendicular to the first portion 52. A third portion 59 extends outwardly from the second edge 56 in a direction toward the support leg 16 substantially perpendicular to the first portion 52. The third portion 58 is notched 60 to receive and closely engage two opposed sides of the squared portion 50 of the support leg 16. It is important that the close radius of the corners of the squared portion 50 are matched by the shape of the notch 60 to provide optimal anti-rotational bracing.

In preferred form, a series of openings 62 is provided along the length of the second portion 58 of the cross-beam 48 to facilitate attachment by banding or tying of cables or wires to the cross-beam 48. Also in preferred form, the outer edge 64 of the second portion 58 may be bent to form an angle with the second portion 58. This provides the cross-beam with added load-bearing capability and provides a smooth edge against which the supported cables or wires may come into contact.

Figure 8:
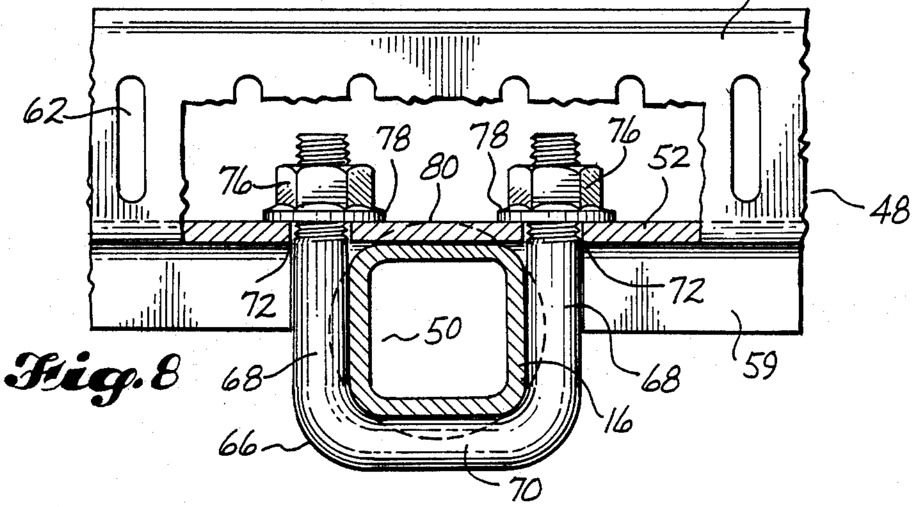
FIG. 8 is a sectional view of the support leg and cross-beam attachment taken substantially along line 8—8 of FIG. 6.

In preferred form, the cross-beam 48 is attached to the support leg 16 by a U-bolt 66 having two substantially parallel threaded end portions 68 and a substantially squared bight portion 70. Preferably, the squared U-bolt 66 is formed from a single piece of material, bent into two right angles such that the threaded end portions 68 are substantially parallel to each other and substantially perpendicular to the squared bight portion 70. It is important that these bends form an inner radius closely matching the shape of the squared portion 50 of the leg 16. Such a construction provides optimal rigidity in the attachment of the support arm 48 to the leg 16. Such a construction also allows the end portions 68 to be closely adjacent and substantially parallel to opposing sides of the squared portion 50, as shown in FIG. 8.

Figure 7:
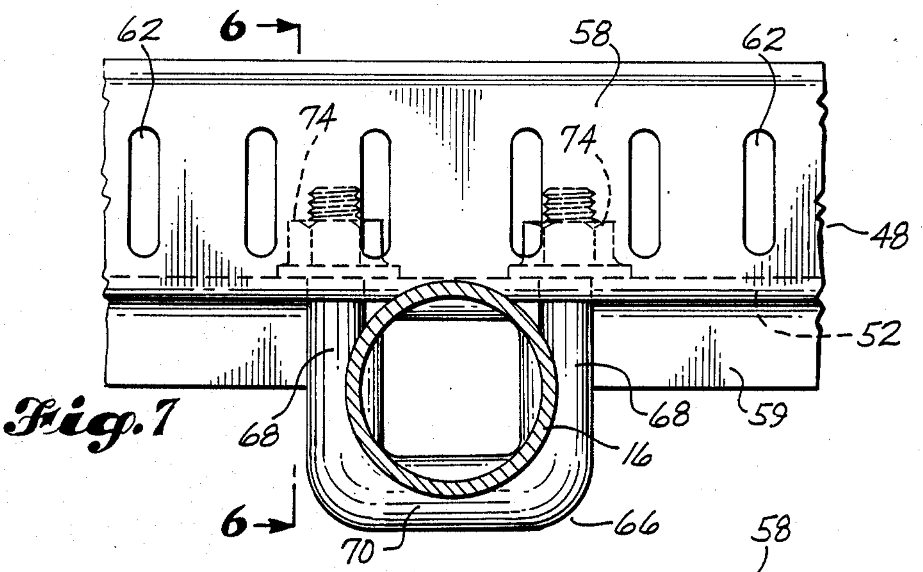
FIG. 7 is a sectional view of the support leg and cross-beam attachment taken substantially along line 7—7 of FIG. 6.
Figure 6:
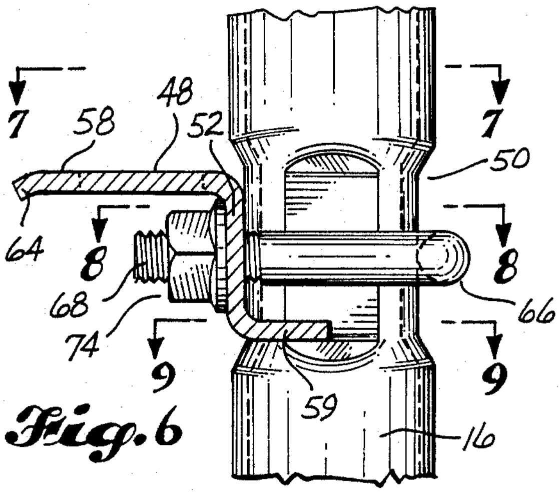
FIG. 6 is a fragmentary view of the attachment of a cross-beam to the support leg taken substantially along line 6—6 of FIG. 7.
Figure 9:
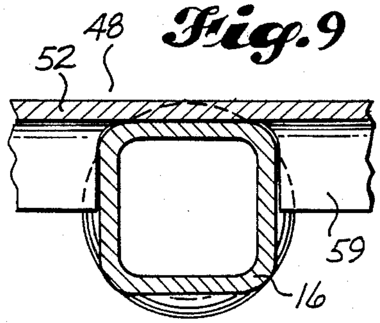
FIG. 9 is a sectional view of the support leg and adjacent cross-beam member taken substantially along line 9—9 of FIG. 6.

Openings 72 are formed in the first portion 52 of the cross-beam 48 such that the threaded end portions 68 of the U-bolt 66 may be inserted into the openings 72 and the support leg 16 engaged therebetween. When assembled, the squared portion 70 of the U-bolt 66 and the first portion 52 of the cross-beam 48 are substantially parallel and closely engage opposite sides of the squared portion 50 of the support leg 16. Threaded end portions 68 of the U-bolt 66 and sides of the notch 60 are also substantially parallel to and closely engage opposite sides of the squared portion 50 of the support leg 16. Threaded portions 68 of the U-bolt 66 pass outwardly through the first portion 52 of the cross-beam 48, as shown in FIGS. 6–8.

It is an important aspect of this invention that flanged nuts 74 be used to engage the threaded end portions 68 of the U-bolt 66. Flanged nuts are well known hardware and comprise a shank having a wrench-engagement portion 76 and an outwardly extending abutment portion 78. As applied to the present invention, the flanged nuts 74 provide a distribution of force against the first portion 52 of the cross-beam 48. As shown in FIG. 8, the abutment portions 78 provide a significant amount of compressive force on the portion 80 of the cross-beam 48 which is between the openings 72. This construction causes the portion 80 to act as a strongback directly opposing the bight portion 70 of the U-bolt 66, which also acts as a strongback. The distribution of force by the abutment portions 78 against the support leg 16, rather than outwardly therefrom, provide a rigid attachment of the cross-beam 48 to the support leg 16. Without such construction, the tightening of unflanged nuts would cause the outwardly projecting portions of the cross-beam 48 to want to bend toward the closed end of the U-bolt 66, thereby making a dihedral of the cross-beam 48.

A pair of cross-beams 48 may be attached to opposite sides of a squared portion 50 of the support leg 16 by a single U-bolt 66 without compromising the rigidity of the attachment. In such an embodiment, the compressive force of the U-bolt 66 on the cross-beams 48 would continue to be exerted substantially at the portion of the cross-beams 48 which is adjacent to the support leg 16, rather than outwardly therefrom.

Also in preferred form, a cap or plug member 82 may be used to cover the open end of the support leg 16. In lieu of this cap or plug member 82, a light fixture or other bracket, as described in my U.S. Pat. No. 4,667,916, which issued May 26, 1987, may be added to the open end of the support leg 16. Such an additional fixture at the end of the support leg 16 would not interfere with the attachment of one or more cross-beam members 48 thereabove.

In accordance with the established laws of patent interpretation, the embodiment that has been illustrated and described has been submitted by way of example only. The scope of protection provided by the patent is to be determined by the terms of the following claims, and by the doctrine of equivalents.

What is claimed is:

1. A wireway suspension system, comprising:

an overhead member;

a downwardly depending elongated support leg attachable at an upper end to the overhead member and having a substantially squared portion along the length of the support leg;

an elongated cross-beam member perpendicularly attachable to the support leg, said cross-beam having a first portion which extends in a vertical plane adjacent and parallel to a side of the squared portion of the support leg and having first and second edges along the length of the cross-beam, a second portion extending outwardly from said first edge away from the support leg substantially perpendicular to the first portion, and a third portion extending outwardly from said second edge toward the support leg substantially perpendicular to the first portion;

said third portion being notched to receive and closely engage two opposed sides of the squared portion of the support leg; and said beam attachable to the support leg by a U-bolt having two threaded end portions and a substantially squared bight portion such that the end portions extend through openings formed in the first portion of the cross-beam and the squared bight portion closely engages three adjacent sides of the squared portion of the support leg, and flanged nuts on the threaded ends of the U-bolt which bear against the first portion of the cross-beam such that the cross-beam is bound to the support leg.

2. The wireway suspension system of claim 1, wherein a series of openings is formed along the length of the second portion of the cross-beam member to facilitate attachment of a wire or cable to the cross-beam member.

3. The wireway suspension system of claim 1, wherein said second portion of said cross-beam member has a free edge which is bent to form an angle with the second portion along the length of the cross-beam member.

4. The wireway suspension system of claim 1, wherein said attachment of the support leg to the overhead member comprises:

a rod member depending from said overhead member having an upper end connected to the overhead member and a threaded portion;

said support leg having a tubular upper portion, an upper end, and an insert in said tubular upper portion having a threaded longitudinal opening for threaded engagement with the threads on said depending member, to form a screw joint; and a brace member at the upper portion of said support leg, said brace member including a small lower end, a large upper end, an opening in its lower end through which the upper portion of the support leg extends, and an annular wall between the upper and lower ends;

means connecting the lower end of the brace member to said support leg at a location spaced axially downwardly from the upper end of the support leg;

said brace member having a circular edge at its upper end which is substantially larger in diameter than said support leg, said edge being positioned to make pressure contact with the overhead member when the support leg is installed on the depending rod member and the screw joint is tightened.

5. The wireway suspension system of claim 4, wherein a bendable tab member is attached to the brace member axially below said upper end and extendable radially outwardly of said upper end, wherein said tab may be attached to said brace member prior to installation of said support leg and subsequently said tab may be attached to the overhead member after installation of the support leg.

6. The wireway suspension system of claim 1, wherein said support leg is substantially an elongated cylinder except in said squared regions.

* * * * *